(12) United States Patent
Lim et al.

(10) Patent No.: US 8,585,428 B2
(45) Date of Patent: Nov. 19, 2013

(54) CONNECTOR

(75) Inventors: Chin Hua Lim, Singapore (SG); Mun Yew Mak, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/514,059

(22) PCT Filed: Dec. 13, 2010

(86) PCT No.: PCT/US2010/060031
§ 371 (c)(1),
(2), (4) Date: Jun. 6, 2012

(87) PCT Pub. No.: WO2011/081870
PCT Pub. Date: Jul. 7, 2011

(65) Prior Publication Data
US 2012/0244741 A1 Sep. 27, 2012

(30) Foreign Application Priority Data
Dec. 15, 2009 (CN) ...................... 2009 2 0292610 U (51) Int. Cl.
*H01R 12/71* (2011.01)

(52) U.S. Cl.
USPC .......................................... 439/377; 439/630

(58) Field of Classification Search
USPC ................................. 439/377, 630
See application file for complete search history.

(56) References Cited

U.S. PATENT DOCUMENTS

| 5,055,061 | A | * | 10/1991 | Lichtenwalter | ............... | 439/377 |
| 5,967,812 | A | | 10/1999 | Tung et al. | | |
| 7,192,304 | B2 | * | 3/2007 | Weingart et al. | ........... | 439/541.5 |
| 7,535,730 | B2 | * | 5/2009 | Junkins et al. | ................ | 361/801 |
| 2008/0101004 | A1 | | 5/2008 | Chen | | |
| 2008/0153335 | A1 | | 6/2008 | Li et al. | | |
| 2012/0244741 | A1 | * | 9/2012 | Lim et al. | ....................... | 439/377 |

OTHER PUBLICATIONS

PCT International Search Report from PCT/US2010/060031 dated Aug. 29, 2011, 3 pages.

* cited by examiner

*Primary Examiner* — James Harvey
(74) *Attorney, Agent, or Firm* — Robert S. Moshrefzadeh (57) ABSTRACT

A card connector is used to connect a memory card, such as CF card or CFast card. The card connector includes a housing; a connecting section for receiving a mating section of the memory card; and a pair of guide sections located on opposite lateral sides of the connecting section to guide the memory card, so that the mating section of the memory card can be connected in a mating engagement with the connecting section of the card connector. A tab is further received within each guide section. The tab has a base section, a pair of elastic sections extending from the sides of the base section, and a grounding section below the base section, wherein each of the two elastic sections protrudes from at least one slot provided in the inner side of each guide section respectively and the grounding section protrudes from a hole provided in the bottom of each guide section. The tabs can provide maximum lifting retention and shear forces due to the memory card insertion and extraction. The elastic sections of the tabs can provide balanced support along the sides of the card and the grounding sections of the tabs can provide electrostatic discharge (ESD) grounding.

10 Claims, 6 Drawing Sheets

CONNECTOR

CROSS REFERENCE TO RELATED APPLICATIONS

This application is a national stage filing under 35 U.S.C. 371 of PCT/US2010/060031, filed Dec. 13, 2010, which claims priority to Chinese Application No. 200920292610.8filed Dec. 15, 2009,the disclosures of which are incorporated by reference in their entirety herein.

FIELD OF THE INVENTION

The present invention relates to a connector, and more particularly to a card connector for connecting a memory card, such as a compact flash (CF) card or a CFast card.

BACKGROUND

With the onslaught of the information age, new computer products have emerged one after another, and relevant peripheral products such as digital printers, digital cameras, digital video cameras, etc. have seen rapid development. Most of these digital products have the capability of loading memory cards as an auxiliary design. Thus, a memory card connector becomes an indispensable loading tool.

Figure 5:
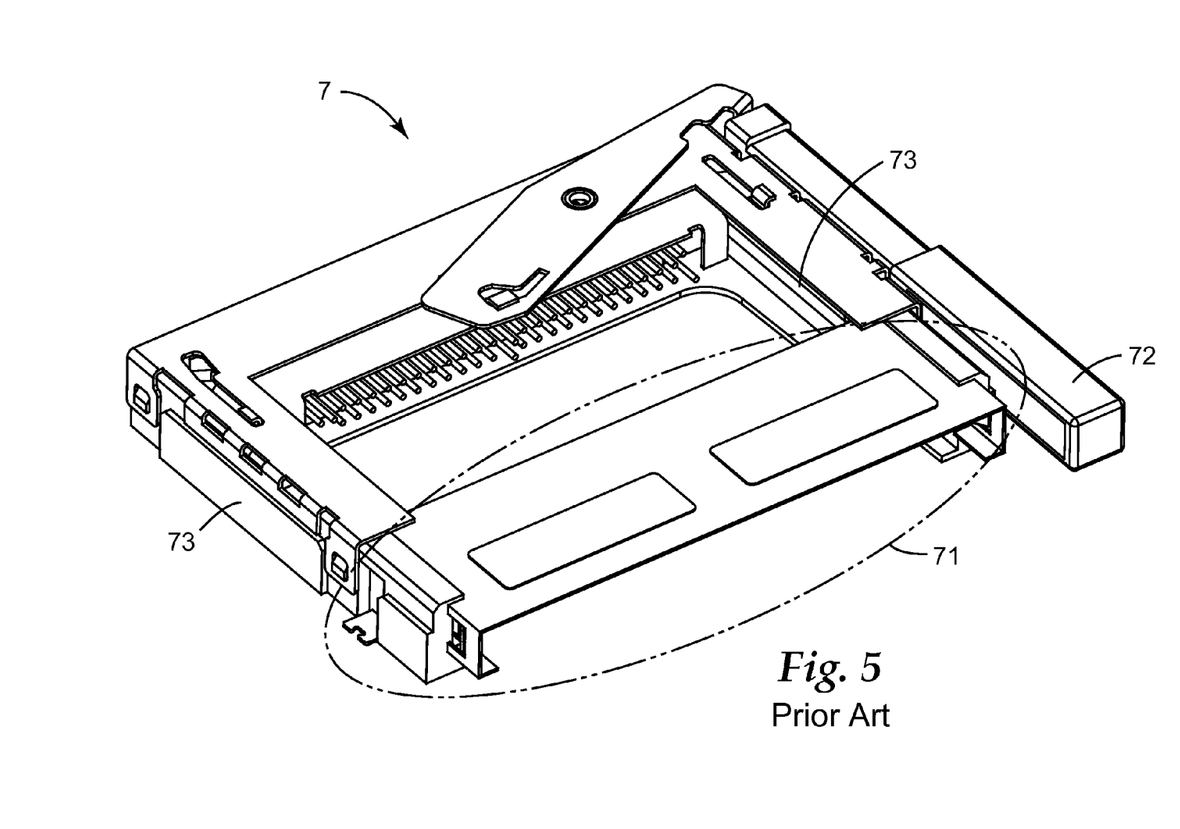
FIG. 5 is a three-dimensional view of a conventional memory card connector.

In a conventional memory card connector 7 (as shown in FIG. 5), a metal support 71 having elastic arms is disposed on guide sections 73, and is combined with a withdrawal mechanism 72. The metal support 71 is used to press against one side of a memory card to prevent the memory card from being released accidentally when being withdrawn from the connector 7.

Although the conventional metal support 71 for pressing against the memory card can prevent the memory card from being released accidentally during withdrawal, the metal support combined with the withdrawal mechanism 72 increases the manufacturing difficulty and cost of the connector 7. Accordingly, the connector 7 is large volume and thus not suitable for use with electronic products which are ever lighter, thinner, and smaller. Besides, the guide sections 73 of the conventional memory card connector 7 usually do not have a sufficient force for clamping two sides of the memory card, so the memory card easily vibrates due to the shaking of the electronic device after the memory card is inserted into the connector 7.

In view of the above, it is really necessary to further provide a connector which can prevent the memory card from being released accidentally during withdrawal without using the metal support with the withdrawal mechanism, reduce the fabrication cost and the volume, alleviate vibrations of the memory card when it is received in the connector, and provide desirable grounding, as well as other advantages.

SUMMARY

Accordingly, the primary objective of the present invention is to provide a connector which is capable of preventing a memory card from being released accidentally during withdrawal without using a withdrawal mechanism and a metal support.

Another objective of the present invention is to provide a connector which is cheaper to manufacture and smaller than a conventional connector.

A further objective of the present invention is to provide a connector which is capable of alleviating vibration of a memory card when the memory card is received therein.

A further objective of the present invention is to provide a connector which is capable of providing electrostatic discharge (ESD) grounding.

In order to achieve the above objectives, the present invention provides a card connector for connecting a memory card, which comprises: a housing; a connecting section, provided on a side of the housing and used for receiving a mating section of the memory card; and a pair of opposite guide sections, each extending from a side of the connecting section to guide the memory card, so that the mating section of the memory card can be connected in a mating engagement with the connecting section of the card connector. Each of the guide sections includes: a slot provided in an inner surface of the guide section; a hole provided in the guide section; and a tab received in the guide section. The tab has a base section, a pair of elastic sections, each elastic section extending from a side of the base section, and a grounding section located below the base section. At least one part of each of the two elastic sections protrudes from the slot of the guide section, and the grounding section protrudes from the hole.

The tabs can provide maximum lifting retention and shear forces due to insertion and extraction of the memory card, the elastic sections of the tabs can provide a balanced support along two sides of the card, and the grounding sections of the tabs can provide ESD grounding.

To make persons skilled in the art understand the technical features of the present invention and implement the present invention accordingly, the following embodiments are illustrated in detail with reference to the accompanying drawings. However, the description is merely intended to illustrate the preferred embodiments of the present invention, and not to limit the present invention in any way. Any modification or variation made without departing from the spirit of the present invention falls within the scope of the present invention.

DETAILED DESCRIPTION

Figure 1:
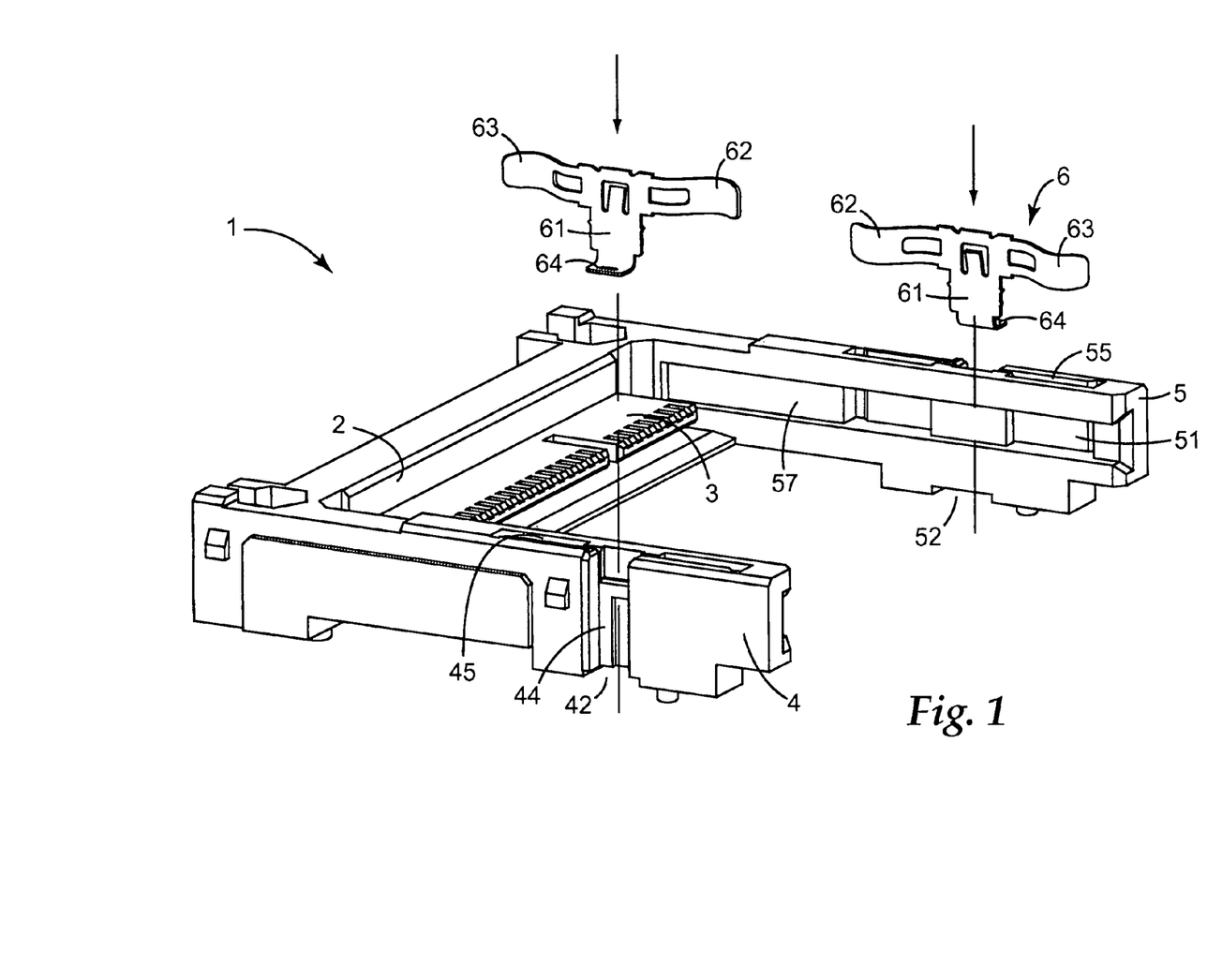
FIG. 1 is an exploded view of a connector in the present invention.
Figure 2A:
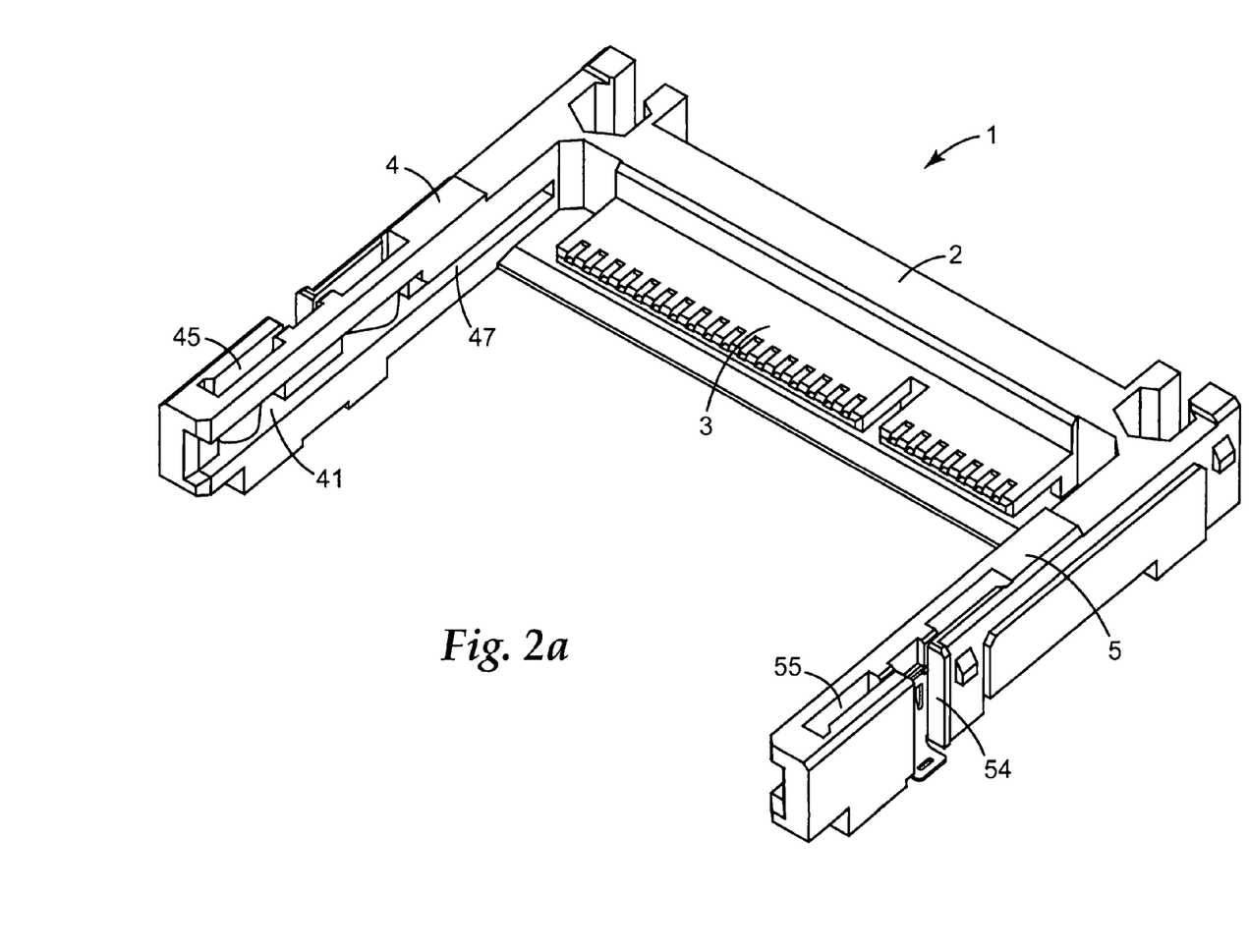
FIGS. 2a and 2b are schematic three-dimensional views of a connector in the present invention.
Figure 2B:
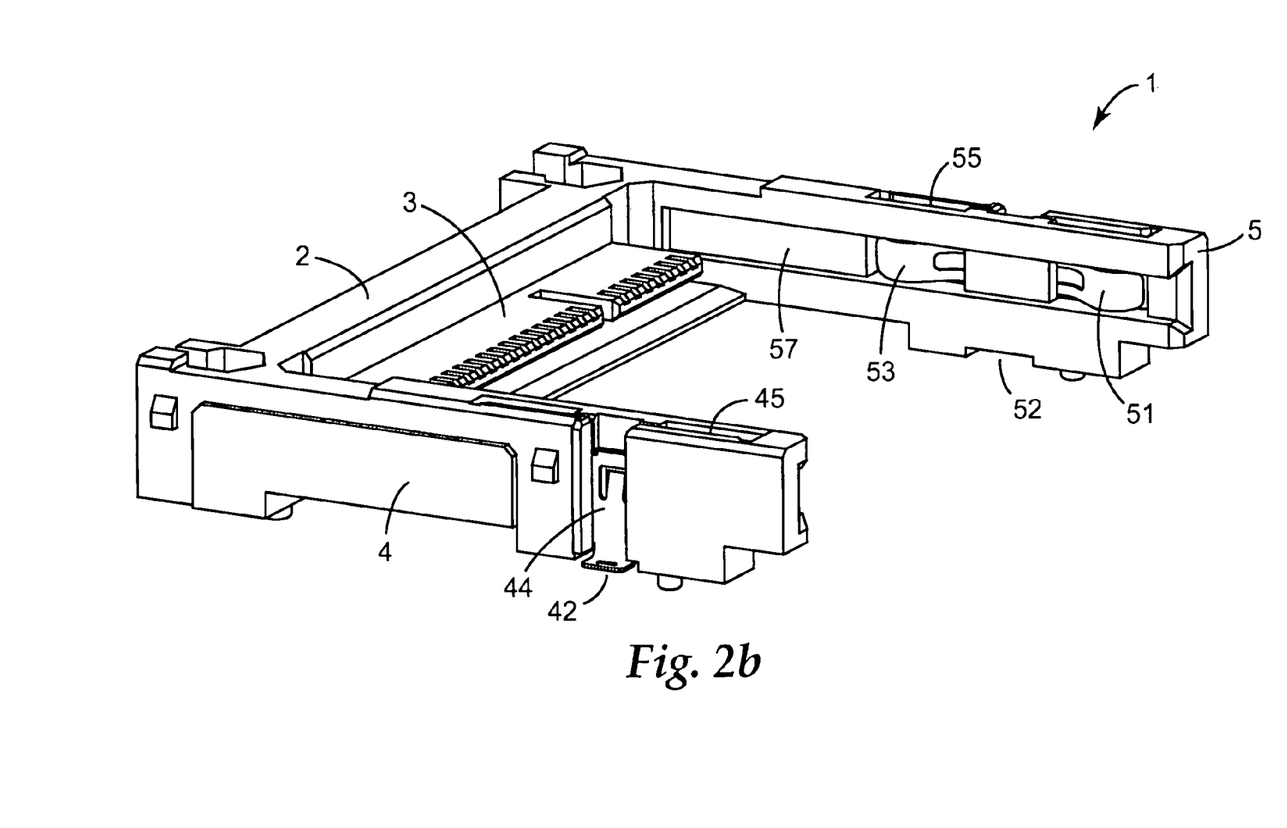
Figure 3:
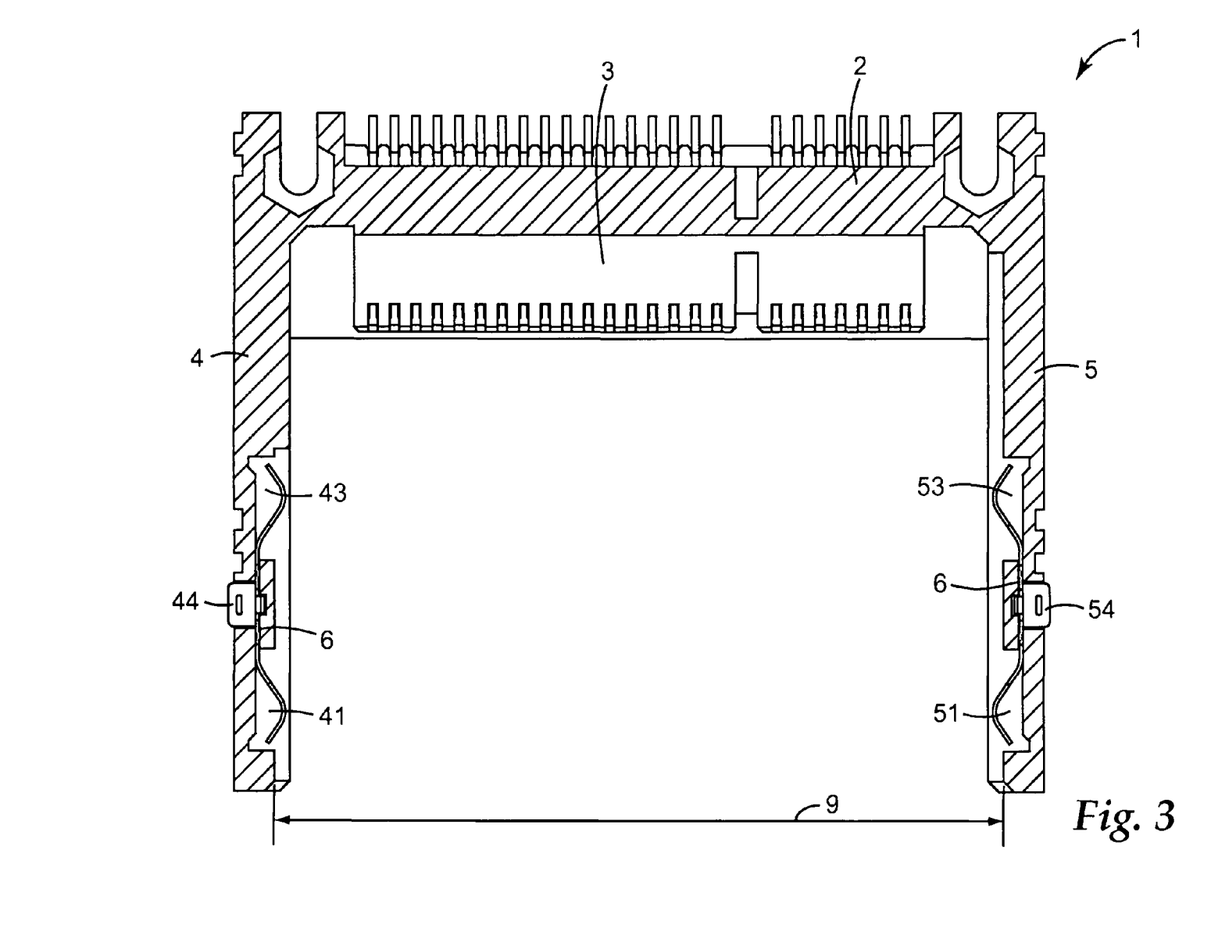
FIG. 3 is a schematic view illustrating combination of a connector and a memory card according to the present invention.

As shown in FIGS. 1 to 3, a card connector 1 according to an embodiment of the present invention can be used to connect a card 9. The card 9 is an integrated circuit (IC) having a memory configured therein, for example a CF card or a CFast card. The card 9 has a mating section, which can be used to mate with a connecting section (as described below) of the card connector 1, so that the card connector 1 and the card 9 are electrically connected.

The card connector 1 includes: an insulating housing 5; a connecting section 3, provided on one side of the housing 5 and used for engaging and connecting with the mating section of the card 9; and a pair of guide sections 4 and 5, extending laterally from two sides of the connecting section 3. The guide sections 4 and 5 are used to guide the mating section of the card 9 to the connecting section 3 of the card connector 1.

Slots 41, 43 and 51, 53 are provided in lateral inner surfaces of the guide sections 4 and 5, respectively, and guide slots 47, 57 are provided below the slots 41, 43 and 51, 53, respectively. Furthermore, elongate openings 45, 55 are provided in the upper surfaces of the guide sections 4 and 5, respectively. Holes 42, 52 are provided in lower surfaces of the guide sections 4 and 5, respectively, and are substantially located below a portion between the slots 41, 43 and 51, 53, respectively. Besides, grooves 44, 54 are provided in the lateral outer surfaces of the ;guide sections 4 and 5, respectively, and can be in communication with the elongate openings 45, 55 and the holes 42, 52.

Figure 4A:
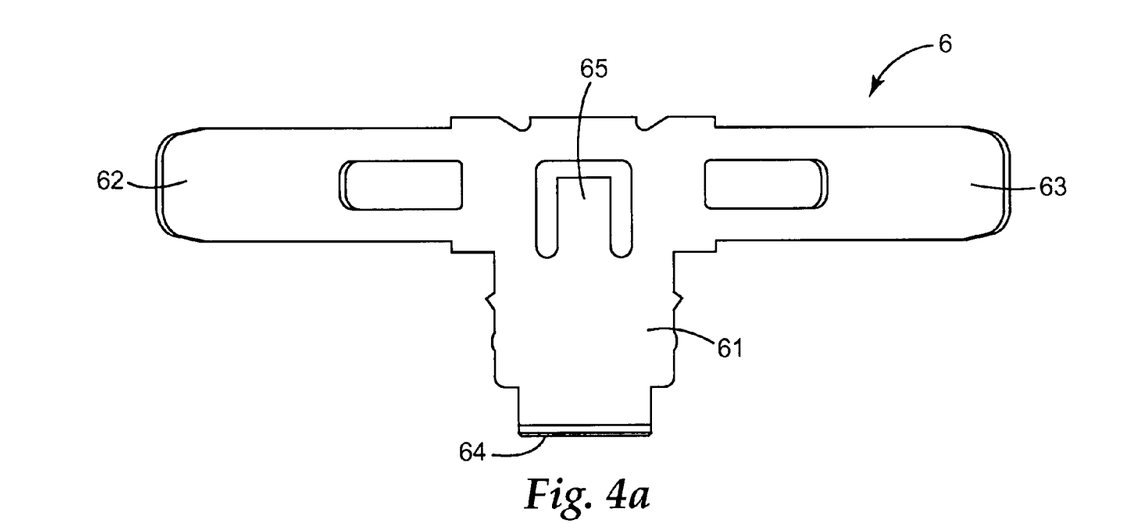
FIGS. 4a and 4b are schematic structural views of a tab of a connector in the present invention.
Figure 4B:
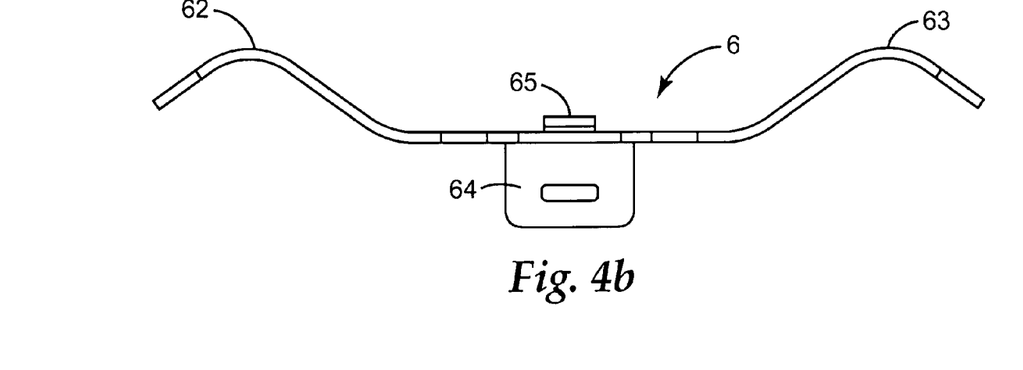

Each of guide sections 4, 5 of the card connector 1 in the present invention has a tab 6 provided therein. As shown in FIGS. 4a and 4b, the tab 6 can be made of a conductive metal material, and has a base section 61, two elastic sections 62 and 63, and a grounding section 64. Each of the elastic sections 62 and 63 of the tab 6 is an arm integrally extending substantially horizontally from each side of the base section 61 and is bent to form a ridge (as shown in FIG. 4b). The grounding section 64 of the tab 6 is located below the base section 61, and can be formed substantially perpendicular to and integrally with the base section 61. The base section 61 of the tab 6 has a tongue-like protrusion 65.

As shown in FIG. 1, the tab 6 can be vertically inserted into the guide sections 4, 5 of the card connector 1 through the elongate openings 45, 55 on the guide sections 4, 5 of the card connector 1, respectively. When the tab 6 is vertically inserted into the guide sections 4, 5 of the card connector 1, the grounding section 64 formed substantially perpendicular to the base section 61 can reach the holes 42, 52 of the guide sections 4, 5 through the grooves 44, 54 of the guide sections 4, 5. Furthermore, after the tab 6 is inserted into the guide sections 4, 5 of the card connector 1, the tongue-like protrusion of the tab 6 can press against the backside inner wall (located in the guide sections 4, 5, not shown) of the portion between the slots 41, 43 and 51, 53, so as to ensure that the tab 6 is well fixed in the guide sections 4, 5.

As shown in FIGS. 2a and 2b, when the tab 6 is fixed in the guide sections 4, 5, the elastic sections 62 and 63 of the tab 6 are exposed to the slots 41, 43 and 51, 53, and the ridges of the elastic sections 62, 63 face the slots 41, 43 and 51, 53, so that the elastic sections 62 and 63 slightly extend out of the slots 41, 43 and 51, 53. Besides, when the tab 6 is fixed in the guide sections 4, 5, the grounding section 64 of each tab 6 is exposed and slightly protrudes from the holes 42, 52 respectively.

As shown in FIG. 3, when the card 9 is inserted into the card connector 1, the connecting section of the card 9 faces the connecting section 3 of the card connector 1, lateral sides of the card are inserted into the guide slots 47 and 57 of the guide sections 4 and 5 of the card connector 1, and the card 9 is moved towards the connecting section 3 of the card connector 1 along the direction indicated by the arrow.

When the card 9 is inserted into the card connector 1, the elastic sections 62 and 63 of each tab 6 contact the two lateral sides of the card 9 and are pressed by the two lateral sides of the card 9, so as to be flexibly bent. In this way, the elastic sections 62 and 63 that are pressed and bent can provide a resilient elastic force to press against the two lateral sides of the card 9.

Each tab 6 is vertically inserted into the guide sections 4, 5 of the card connector, and thus provides a maximum retention force during the insertion and extraction of the card 9. Moreover, when the card 9 is inserted into the card connector 1, the elastic sections 62 and 63 of the tab 6 provide an elastic force which is towards the lateral sides of the card 9 and presses against the card 9, so that the card 9 can be securely clamped. The ESD grounding efficacy can be achieved by the grounding section 64 of the tab 6.

The above embodiments can be modified in accordance with the spirit of the present invention, for example, the manner of fixing each tab in the guide section of the card connector, the appearance and form of the elastic section of the tab, or the like, may be modified. Alternatively, the guide section may have more than one slot, or the tab 6 may be formed by separate members. Such modifications would not depart from the spirit and important characteristics of the present invention. Therefore, the embodiments listed above are illustrative and not limitative in any way, and all variations fall within the scope of the present invention as long as they conform to the meaning and scope of the claims or their equivalents.

List of Reference Numerals
1 Connector
2 Housing
3 Connecting section
4 Guide section
41 Slot
42 Hole
43 Slot
44 Groove
45 Opening
47 Guide slot
5 Guide section
51 Slot
52 Hole
53 Slot
54 Groove
55 Opening
57 Guide slot
6 Tab
61 Base section
62 Elastic section
63 Elastic section
64 Grounding section
65 Tongue-like protrusion
9 Memory card
7 Connector
71 Metal support
72 Withdrawal mechanism
73 Guide section

What is claimed is:

1. A card connector for connecting a memory card, comprising:
   a housing;
   a connecting section provided on a side of the housing for receiving a mating section of the memory card; and
   a pair of opposite guide sections, each extending from a corresponding side of the connecting section to guide the memory card so that the mating section of the memory card can be connected in a mating engagement with the connecting section of the card connector, each guide section including:
   a slot provided in an inner surface of the guide section,
   a hole provided in the guide section, and
   a tab received in the guide section having a base section, a pair of elastic sections, each elastic section extending from a side of the base section and a grounding section below the base section, wherein at least a portion of each of the two elastic sections protrudes from the slot and the grounding section protrudes from the hole.

2. A card connector according to claim 1, wherein the elastic sections of the tab are integrally formed with the base section.

3. A card connector according to claim 1, wherein each of the elastic sections is an arm which is bent to form a ridge.

4. A card connector according to claim 1, wherein each guide section comprises two slots provided along the lateral inner surface of the guide section, and at least a portion of each of the two elastic sections protrudes from one of the slots.

5. A card connector according to claim 4, wherein the hole is substantially located below the portion between the two slots of the guide section.

6. A card connector according to claim 1 or 5, wherein each guide section further comprises an elongated opening provided in an upper surface thereof and the tab is inserted into the guide section through the elongated opening.

7. A card connector according to claim 6, wherein the grounding section is integrally formed with the base section.

8. A card connector according to claim 7, wherein the grounding section is formed generally perpendicular to the base section.

9. A card connector according to claim 8, wherein each guide section further comprises a groove provided in the outer surface of the guide section and communicating with the hole and the elongated opening, wherein the tab is inserted into the guide section through the elongated opening and the groove.

10. A card connector according to claim 1, wherein each guide section further comprises a guide slot which assists the guide section in guiding the card into mating engagement with the connecting section.

\* \* \* \* \*

UNITED STATES PATENT AND TRADEMARK OFFICE
CERTIFICATE OF CORRECTION

| | |
|---|---|
| PATENT NO. | : 8,585,428 B2 |
| APPLICATION NO. | : 13/514059 |
| DATED | : November 19, 2013 |
| INVENTOR(S) | : Lim et al. |

Page 1 of 1

It is certified that error appears in the above-identified patent and that said Letters Patent is hereby corrected as shown below:

In the Specification

<u>Column 1</u>
Line 9, delete "200920292610.8filed" and insert -- 200920292610.8 filed --

Line 9, delete "2009,the" and insert -- 2009, the --

<u>Column 3</u>
Line 10 (approx.), delete "the ;guide" and insert -- the guide --

Signed and Sealed this
Third Day of June, 2014

Michelle K. Lee
*Deputy Director of the United States Patent and Trademark Office*